Nov. 18, 1924.  
E. P. STEVENSON  
1,515,799  
METHOD OF TREATING SPENT PICKLING LIQUORS  
Filed Sept. 5, 1922
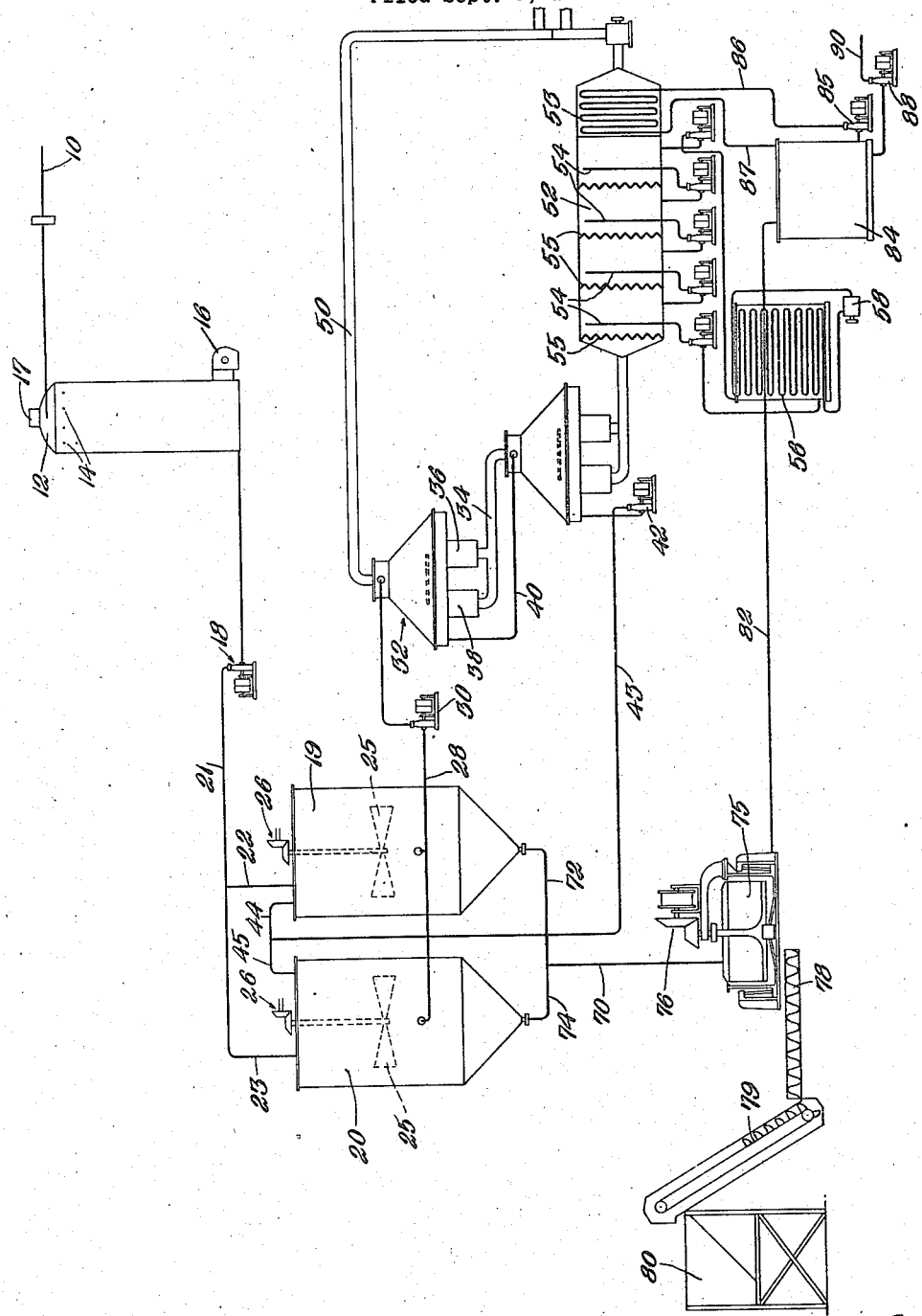

Patented Nov. 18, 1924.

1,515,799

UNITED STATES PATENT OFFICE.

EARL P. STEVENSON, OF NEWTON, MASSACHUSETTS, ASSIGNOR TO ARTHUR D. LITTLE, INC., OF NEWTON, MASSACHUSETTS, A CORPORATION OF MASSACHUSETTS.

METHOD OF TREATING SPENT PICKLING LIQUORS.

Application filed September 5, 1922. Serial No. 586,139.

*To all whom it may concern:*

Be it known that I, EARL P. STEVENSON, a citizen of the United States, residing at Newton, in the county of Middlesex and State of Massachusetts, have invented certain new and useful Improvements in Methods of Treating Spent Pickling Liquors; and I do hereby declare the following to be a full, clear, and exact description of the invention, such as will enable others skilled in the art to which it appertains to make and use the same.

The present invention relates to a method and apparatus for the treatment of spent pickling liquors which serves to recover copperas from the pickling liquor and regenerate the latter in such a manner that it is in condition for further use.

After a certain period the dilute sulphuric acid used as a pickling liquor becomes unfit for further use due to the formation of quantities of iron sulphate or copperas, as it is commonly known. When the hot solution of pickling liquor becomes supersaturated with this copperas, it is deposited on the surface of the articles under treatment, leaving objectionable stains. Furthermore, the efficiency of the acid for the removal of the scale becomes impaired to such an extent that it must be removed. Partly due to the fact that the iron sulphate or copperas is a merchantable product and partly due to the fact that the pickling liquor when unfit for further use as such cannot ordinarily be discharged into sewers or similar places of disposal, various attempts have been made to separate the copperas from the spent pickling liquor both for the purpose of recovering the copperas as such and for regenerating the pickling liquor to permit further use. So far as known, these prior efforts to secure a practical separation of the copperas from the pickling liquor have consisted primarily in reducing the temperature of the pickling liquor to a point at which the copperas was precipitated in the form of crystals, these methods relying simply upon the reduced capacity of the liquor to carry iron sulphate in solution with reduction of temperature. In certain other methods it was also proposed to subject the spent pickling liquor consisting of a supersaturated and dilute solution of sulphuric acid to a higher temperature in order to evaporate moisture therefrom and concentrate the solution, thereafter cooling this solution and precipitating out the iron sulphate in the usual manner.

According to the present invention, the spent pickling liquor is regenerated and the copperas substantially removed therefrom without the formation of any considerable amount of iron sulphate upon the walls of the treating apparatus and in a minimum of time. It will be obvious to those skilled in the art that in treating large amounts of pickling liquor, as is the case in the iron and steel industry, the element of time is of great importance and a reduction in the amount of time consumed in the separation process permits the same apparatus to handle materially larger quantities of pickling liquor.

According to the present invention the spent pickling liquor saturated with copperas is brought in the form of a spray into direct and intimate contact with a moving body of air at a lower temperature. By this method comparatively large volumes of air are brought into contact with the relatively hotter liquor in a short space of time, reducing the temperature and concentrating the liquor by the absorption of moisture therefrom. By thus bringing the hot liquor into intimate contact with air at a lower temperature having capacity for the absorption of moisture, the process of separation is accelerated due in part to the reduction of temperature and in part to the concentration of the liquor. In the preferred form of the invention the hot liquor is first sprayed through a body of atmospheric air moving in the opposite direction, which cools and abstracts moisture from the liquor. In this connection it may be noted that even though the atmospheric air is substantially saturated with moisture when initially brought into contact with the spray of hot liquor the transfer of heat to the air will create capacity for absorption of moisture and cause evaporation of moisture from the liquor. This evaporation of moisture from the liquor serves not only the purpose of concentrating the liquor but materially aids in reducing the temperature. Subsequently to this contact with atmospheric air, the liquor is sprayed through a moving body or curtain of artificially refrigerated air, which further reduces the temperature and absorbs moisture from the liquor. This artificially refrigerated air after its passage through the spray of hotter liquor may be returned through a refrigerating apparatus and the temperature again lowered for re-use. After the temperature of the liquor has been reduced to the proper point, the sluggish mass of concentrated and relatively cold liquor is conveyed, while in a constant state of agitation, to a suitable type of centrifugal machine, which mechanically separates the crystal formation from the sulphuric acid. In order to complete the process, the cold regenerated sulphuric acid may be employed for wholly or partially refrigerating the cooling air before the return of the acid to the pickling bath.

From the foregoing description it will be manifest that the present method represents a distinct departure from prior methods in this field, due to the simultaneous concentration and lowering of temperature of the spent pickling liquor by bringing the liquor into direct and intimate contact with comparatively large bodies of air, which serve to both concentrate the liquor and to reduce the temperature partly by the evaporation of moisture therefrom and partly by the direct transfer of heat from the liquor to the air.

The accompanying drawing illustrates diagrammatically an apparatus which is believed to be particularly well adapted for carrying out the new method, this apparatus employing in part certain mechanisms which are well known and in common use for other purposes. In this connection it is to be understood, however, that the present invention is not limited to the employment of this particular apparatus but contemplates the use of other apparatus either in part or in whole, provided that such apparatus is found suitable for carrying out the new method.

Referring more particularly to the drawing, the hot supersaturated solution of pickling liquor is pumped or moved by gravity through a pipe 10 into a spray chamber 12, the liquor being sprayed downwardly through the chamber from a series of nozzles 14. This downwardly moving spray of hot liquor encounters in its passage a large body of upwardly moving atmospheric air delivered to the lower end of the spray chamber by any suitable form of pump or fan, indicated at 16. The atmospheric air during its passage upwardly through the spray chamber reduces the temperature of the liquor and absorbs the moisture therefrom, finally passing out through an opening 17 at the top. After its passage through the spray chamber, the pickling liquor reduced in temperature and partially concentrated is delivered by a pump, indicated at 18, to either one of two chambers 19 or 20, the delivery pipe 21, as shown, having connections 22 and 23 with each of the chambers. While in these chambers, the liquor is maintained in a constant state of agitation by agitator members 25 constantly driven through any suitable type of mechanism, indicated at 26. The liquor is drawn from these agitator chambers through a pipe 28 and is delivered by the pump 30 to the upper portion of a centrifugal spray apparatus, indicated generally at 32. The sheet or spray of liquor formed by the centrifugal action of this machine encounters a large volume of artificially refrigerated air delivered thereto through a pipe 34 having branches 36 and 38. In the illustrated embodiment of the invention two of these centrifugal spray machines are shown, the liquor passing from one to the next through a pipe 40 and the cooling air passing in the opposite direction from the top of one apparatus to the under portion of the next through the pipe 34. After completing its traverse of the spray apparatus and having been reduced in temperature, the liquor is returned by a pump 42 to one of the two agitator chambers 19 and 20 through a pipe 43 and branch connection 44 and 45. The cooling air passes from the top of the first spray apparatus into a pipe 50 and is returned by this pipe to a cooling and spray chamber 52. As will be observed, the air upon entering the spray chamber first encounters refrigerating coils 53 and thereafter passes through successive sprays 54 which may be refrigerated or not, depending upon the temperature of the incoming air. As shown, the apparatus is also provided with successive series of baffles 55 to prevent entrainment of moisture in the air. If so desired, the spray liquid may be passed about refrigerating coils, indicated generally at 56, and supplied with any suitable type of refrigerant by a pump indicated at 58. According to this method, the pickling liquor after first encountering atmospheric air next encounters artificially refrigerated air, which may be at a temperature initially of 0° F. or thereabouts. Thus the separation of the copperas from the liquor is again accelerated by the concentration of the liquor as well as a reduction in temperature, the artificially refrigerated air having great capacity in the volumes employed for the absorption of moisture from the liquor. In this connection it will be evident that the absorption of moisture from the liquor becomes progressively less as the temperature of the liquor gradually approaches the temperature of the air during its passage through successive spray chambers. If it is desired to again pass the liquor through the spray chambers 32, this is permitted through a proper manipulation of the valves controlling the outlet from the agitator chambers 19 and 20, the liquor being subjected to the action of the spray chambers as often as desired until the proper condition has been attained. When the liquor in either of the agitator chambers 19 and 20 has been reduced to the proper condition of temperature and concentration, it is delivered through a pipe 70 and branch connections 72 and 74 to a centrifuge, indicated at 75, and operated by any suitable form of mechanism, indicated at 76, to mechanically separate the crystal formation from the liquor. After such mechanical separation, the crystal formation may be scraped or mechanically removed from the centrifuge and delivered by a worm 78 and a conveyer 79 to a receptacle 80. The cold regenerated liquor, on the other hand, is delivered through a pipe 82 to a container 84. From this container the cold liquor may be delivered to the refrigerating coils 53 by a pump 85 and pipes 86 and 87 or returned to the pickling bath by a pump 88 and pipe 90.

From the foregoing description of the new method and apparatus it will be evident that the regeneration of the spent pickling liquor with the accompanying separation of iron sulphate therefrom is progressive and continuous and during the entire process the liquor is maintained in a more or less constant state of agitation. Although the specific embodiment of the invention disclosed in the drawing illustrates the employment of two agitator chambers from which the spent liquor is delivered, it will be evident to those skilled in the art that in actual practice a sufficient number of chambers may be utilized to make regeneration of the spent liquor substantially a continuous process. Furthermore, it may be remarked that when a solution of ferrous sulphate is cooled by the usual methods in which the surrounding surfaces of the container with which the liquid is in contact are chilled by artificial cooling there is a tendency to form crusts of copperas on the cooling surface rather than in the body of the solution. On the other hand, in the present method, in reducing the temperature of the liquor by spraying it into direct or intimate contact with a large volume of air, this tendency to crust formation is minimized as the cooling is carried out through the entire body of liquid.

It should be understood that an important feature of the present invention relates to a method of precipitating solids out of solution by the initial employment of atmospheric air to concentrate and lower the temperature of the solution supplemented by the use of artificially refrigerated air to further the cooling process. This feature, together with certain other features of the invention, is applicable to the cooling of hot solutions other than spent picking liquor, and it is intended that the invention as to its broader features shall not be limited to the cooling of spent pickling liquors.

I claim:—

1. A process of treating spent pickling liquors which comprises bringing a hot saturated solution of pickling liquor into direct and intimate contact with air at a materially lower temperature and in sufficiently large volume to effect substantial absorption of water from the pickling liquor.

2. A process of treating spent pickling liquors which comprises bringing a saturated solution of pickling liquor in the form of a spray into intimate contact with a moving body of air at a lower temperature and having capacity for absorption of moisture from the pickling liquor.

3. A process of treating pickling liquors which comprises spraying a saturated solution of pickling liquor into direct and intimate contact with air at a lower temperature and having capacity for absorption of moisture from the liquor, and cooling the air and removing moisture therefrom after contact with the pickling liquor and the transfer of heat and moisture thereto.

4. A process of treating pickling liquors which consists in bringing a solution of pickling liquor successively into contact with air at temperatures materially lower than the temperature of the solution in contact therewith to concentrate and reduce the temperature of the liquor in successive stages, maintaining the liquor in continuous motion during the process of concentrating and lowering the temperature, and finally separating the resulting crystals from the liquor.

5. A process of treating pickling liquors which consists in bringing the hot liquor in the form of a spray into direct contact with a moving body of atmospheric air to concentrate and reduce the temperature of the liquor, subsequently subjecting the liquor in the form of a spray to artificially refrigerated air, and finally recovering the crystal formation from the liquor mechanically.

6. A process of treating pickling liquors which consists in bringing the hot liquor in the form of a spray into direct contact with a moving body of atmospheric air to concentrate and reduce the temperature of the liquor, subsequently subjecting the liquor in the form of a spray to artificially refrigerated air, and finally recovering the crystal formation from the liquor mechanically, the liquor being maintained in a constant state of agitation until the crystal formation has been finally separated therefrom.

7. A process of precipitating solids from solutions which consists in initially spraying relatively hot solutions through a comparatively large body of atmospheric air to concentrate and cool the solution and thereafter bringing the cooled solution into direct and intimate contact with artificially cooled or refrigerated air.

EARL P. STEVENSON.